US010322763B2

(12) United States Patent
Kouchi et al.

(10) Patent No.: US 10,322,763 B2
(45) Date of Patent: Jun. 18, 2019

(54) HEAD LAMP DEVICE OF STRADDLE-TYPE VEHICLE

(71) Applicant: KAWASAKI JUKOGYO KABUSHIKI KAISHA, Kobe-shi, Hyogo (JP)

(72) Inventors: Kaoru Kouchi, Kakogawa (JP); Toru Sato, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 122 days.

(21) Appl. No.: 15/584,901

(22) Filed: May 2, 2017

(65) Prior Publication Data

US 2017/0327169 A1    Nov. 16, 2017

(30) Foreign Application Priority Data

May 10, 2016  (JP) ................................. 2016-094237

(51) Int. Cl.
| | |
|---|---|
| *B60Q 1/06* | (2006.01) |
| *B62J 6/02* | (2006.01) |
| *F21S 41/20* | (2018.01) |
| *F21S 41/36* | (2018.01) |
| *F21S 41/141* | (2018.01) |
| *F21Y 115/10* | (2016.01) |

(52) U.S. Cl.
CPC ................. *B62J 6/02* (2013.01); *B60Q 1/06* (2013.01); *F21S 41/141* (2018.01); *F21S 41/28* (2018.01); *F21S 41/36* (2018.01); *F21Y 2115/10* (2016.08)

(58) Field of Classification Search
CPC . B60Q 1/04; B60Q 1/06; B60Q 1/0041; B62J 6/02; F21Y 2115/10; F21S 41/141; F21S 41/28; F21S 41/36; F21S 41/333; F21S 41/336
See application file for complete search history.

(56) References Cited

U.S. PATENT DOCUMENTS

| | | | | |
|---|---|---|---|---|
| 7,674,023 | B2* | 3/2010 | Ohira | B60Q 1/0035 180/218 |
| 8,118,460 | B2* | 2/2012 | Hotei | B60Q 1/0041 362/184 |
| 9,302,724 | B2* | 4/2016 | Hayashi | B62J 6/02 |
| 2014/0293629 | A1* | 10/2014 | Otsuji | B62J 6/02 362/475 |
| 2018/0093729 | A1* | 4/2018 | Srivirat | B62J 6/02 |

FOREIGN PATENT DOCUMENTS

JP         2014117994 A     6/2014

* cited by examiner

*Primary Examiner* — Peggy A Neils
(74) *Attorney, Agent, or Firm* — Alleman Hall Creasman & Tuttle LLP

(57) ABSTRACT

A head lamp device of a straddle-type vehicle, comprises at least one lamp unit including at least one light source and a plurality of emission ports through which light emitted from the light source is output; and a cover member including a transmission section which transmits in a forward direction of a vehicle body, the light output through the plurality of emission ports, and covering a front portion of the lamp unit, wherein the transmission section includes a first surface, and a second surface bent with respect to the first surface, and an edge is provided on a ridge line formed by the first surface and the second surface, and wherein the edge extends through a gap formed between two adjacent emission ports of the plurality of emission ports.

18 Claims, 6 Drawing Sheets

HEAD LAMP DEVICE OF STRADDLE-TYPE VEHICLE

CROSS-REFERENCE TO THE RELATED APPLICATION

This application claims priority to and the benefit of Japanese Patent Application No. 2016-094237 filed on May 10, 2016, the entire disclosure of which is incorporated herein by reference.

BACKGROUND OF THE INVENTION

Field of the Invention

The present invention relates to a headlamp device of a straddle-type vehicle.

Description of the Related Art

For example, as disclosed in Japanese Laid-Open Patent Application Publication No. 2014-117994, a headlamp device of a straddle-type vehicle includes a pair of lamp units including a plurality of light sources, and a cover member covering the front portions of the pair of lamp units. The cover member is provided with transmission sections which transmit therethrough in a forward direction light emitted from the plurality of light sources of the pair of lamp units.

Conventionally, a priority is given to keeping good light emission characteristics of light emission from the headlamp device to a road surface or the like, in the cover member of the headlamp device of the straddle-type vehicle. For this reason, a design flexibility of the external appearance of the cover member is low, and it is difficult to improve the external appearance of the cover member.

SUMMARY OF THE INVENTION

An object of the present invention is to provide a headlamp device of a straddle-type vehicle which can design the external appearance of a cover member more flexibly while keeping required light emission characteristics of the headlamp device.

According to an aspect of the present invention, a headlamp device of a straddle-type vehicle, comprises at least one lamp unit including at least one light source and a plurality of emission ports through which light emitted from the light source is output; and a cover member including a transmission section which transmits in a forward direction of a vehicle body, the light output through the plurality of emission ports, and covering a front portion of the lamp unit, wherein the transmission section includes a first surface, and a second surface bent with respect to the first surface, and an edge is provided on a ridge line formed by the first surface and the second surface, and wherein the edge extends through a gap formed between two adjacent emission ports of the plurality of emission ports.

In accordance with this configuration, even in a case where the external appearance of the cover member is designed so that the edge is provided on the ridge line formed by the first surface and the second surface of the transmission section, the light emitted from the light source and output through the two adjacent emission ports is less likely to contact the edge of the transmission section, because the edge extends through the gap formed between the two adjacent emission ports. Thus, the light emission characteristics of the headlamp device are not affected by the edge, and good light emission characteristics of the light emission from the headlamp device to the road surface or the like can be kept. As a result, it becomes possible to design the external appearance of the cover member more flexibly while keeping required light emission characteristics of the headlamp device of the straddle-type vehicle.

The lamp unit may further include two reflector sections which are provided to correspond to the two adjacent emission ports, respectively, reflect the light emitted from the light source, and cause the light to be output through the two adjacent emission ports, and when viewed from a front, the edge may extend through a gap formed between the two reflector sections.

In accordance with this configuration, since the edge of the transmission section extends through the gap formed between the two reflector sections, when viewed from the front, the light paths of the light reflected by the reflector sections are less likely to contact the edge. As a result, it becomes possible to design the external appearance of the cover member more flexibly while keeping required light emission characteristics of the headlamp device of the straddle-type vehicle.

The headlamp device may further comprise a frame member disposed between the cover member and the light source in a forward and rearward direction of the vehicle body, the frame member may overlap with the gap formed between the two adjacent emission ports, in the forward and rearward direction, and the edge may overlap with the frame member in the forward and rearward direction.

In accordance with this configuration, since the frame member serves to more effectively prevent the light emitted from the light source and output through the two emission ports from contacting the edge of the transmission section, it become possible to prevent the light emitted from the light source from being scattered by the edge.

The first surface and the second surface of the transmission section may be closer to each other in a vertical direction, from a rear portion toward a front portion, and the ridge line may be formed by a front end edge of the first surface and a front end edge of the second surface, and the edge may be provided on the ridge line.

In accordance with this configuration, since the edge provided in the transmission section protrudes forward farther than the first surface and the second surface do, long light paths of the light emitted from the light source, from the light source to the transmission section can be easily secured, compared to a case where the edge provided in the transmission section protrudes rearward farther than the first surface and the second surface do. For this reason, between the light source and the transmission section, the position of the light path of the light emitted from the light source can be easily adjusted, and it becomes possible to prevent the light emitted from the light source from contacting the edge.

The two adjacent emission ports may be apart from each other in a vertical direction, the transmission section may include an upper surface and a lower surface which are adjacent to each other at the edge as a boundary, and the lower surface may be inclined in a downward direction, from a front portion toward a rear portion.

In accordance with this configuration, a projection area of the headlamp device in the front view can be reduced, and the external appearance of the cover member can be easily designed to have, for example, a streamline shape in which a dimension in the vertical direction and a dimension in the rightward and leftward direction are gradually increased, from a front portion toward a rear portion. Further, a traveling resistance received from the air flowing from the front can be reduced, during traveling of the straddle-type vehicle.

The lower surface may be a curved surface which is recessed in a rearward direction, from the edge toward a rear portion. Since the lower surface with this configuration, of the transmission section, is less noticeable, the external appearance of the headlamp device can be made compact, and the lower surface of the transmission section does not reflect external light toward, for example, a person riding in another vehicle coming from an opposite direction.

An upper emission port of the two adjacent emission ports may be located outward in a rightward and leftward direction of the vehicle body relative to a lower emission port of the two adjacent emission ports, at least a portion of the upper emission port is located rearward of the lower emission port, and the edge may extend in the rightward and leftward direction.

In this configuration, the external appearance of the cover member can be designed so that the edge extends in the rightward and leftward direction, and the size of the lower surface of the transmission section which is seen in a plan (top) view can be reduced. In this way, the external appearance of the headlamp device can be made compact.

A low beam may be output through a first emission port of the two adjacent emission ports, and a high beam may be output through a second emission port of the two adjacent emission ports. In accordance with this configuration, in the headlamp device in which the emission port through which the low beam is output and the emission port through which the high beam is output are arranged in the vertical direction, the external appearance of the cover member can be designed more flexibly while keeping required light emission characteristics of the headlamp device.

The at least one lamp unit may be a part of (may include) a pair of lamp units disposed at right and left sides, respectively, in a rightward and leftward direction of the vehicle body, and the edge may be provided in each of the pair of lamp units. Compared to a case where an edge extending in the rightward and leftward direction is provided in a single lamp unit of a straddle-type vehicle including the single lamp unit, the external appearance of the cover member can be designed so that the total length of the edges of the transmission sections of the pair of lamp units can be increased while reducing the bores of the emission ports of each of the lamp units.

The at least one light source may be a part of (main include) two light sources disposed apart from each other in a vertical direction, and when viewed from a front, a lower light source of the two light sources may be disposed closer to a center of the vehicle body in a rightward and leftward direction of the vehicle body than an upper light source of the two light sources is. In accordance with this configuration, it becomes possible to design the headlamp device so that the light sources are arranged in the vertical direction and are deviated from each other in the rightward and leftward direction when viewed from the front. In addition, it becomes possible to design the external appearance of the cover member more flexibly while keeping required light emission characteristics of the headlamp device of the straddle-type vehicle.

The at least one light source may be a light emitting diode (LED). Since the light emitting diode is used as the light source, the angle of the light emission of the light source is smaller and spread of the emitted light is suppressed, compared to other kinds of light sources. Therefore, it becomes possible to more effectively prevent the light emitted from the light source from contacting the edge provided in the transmission section. In addition, the two adjacent emission ports can be made close to each other while keeping required light emission characteristics of the headlamp device. Further, the external appearance of the cover member can be designed so that the edge of the transmission section protrudes forward farther than the first surface and the second surface do, and an angle formed between the first surface and the second surface, at a side which is opposite to the side where the edge protrudes, in the cross-section of the cover member perpendicular to the direction in which the edge extends, is reduced. Thus, the external appearance of the cover member can be designed more flexibly.

In accordance with the present invention, it becomes possible to provide a headlamp device of a straddle-type vehicle which can design the external appearance of a cover member more flexibly while keeping required light emission characteristics of the headlamp device.

The above and further objects, features and advantages of the present invention will more fully be apparent from the following detailed description of preferred embodiment with reference to the accompanying drawings.

DETAILED DESCRIPTION OF THE EMBODIMENTS

Hereinafter, the embodiments of the present invention will be described with reference to the drawings. Throughout the drawings, the same or corresponding components are designated by the same reference symbols, and will not be described repeatedly. The stated directions are from the perspective of a rider straddling a straddle-type vehicle 1. A vehicle width direction of the vehicle body of the straddle-type vehicle 1 corresponds with a rightward and leftward direction.

Figure 1:
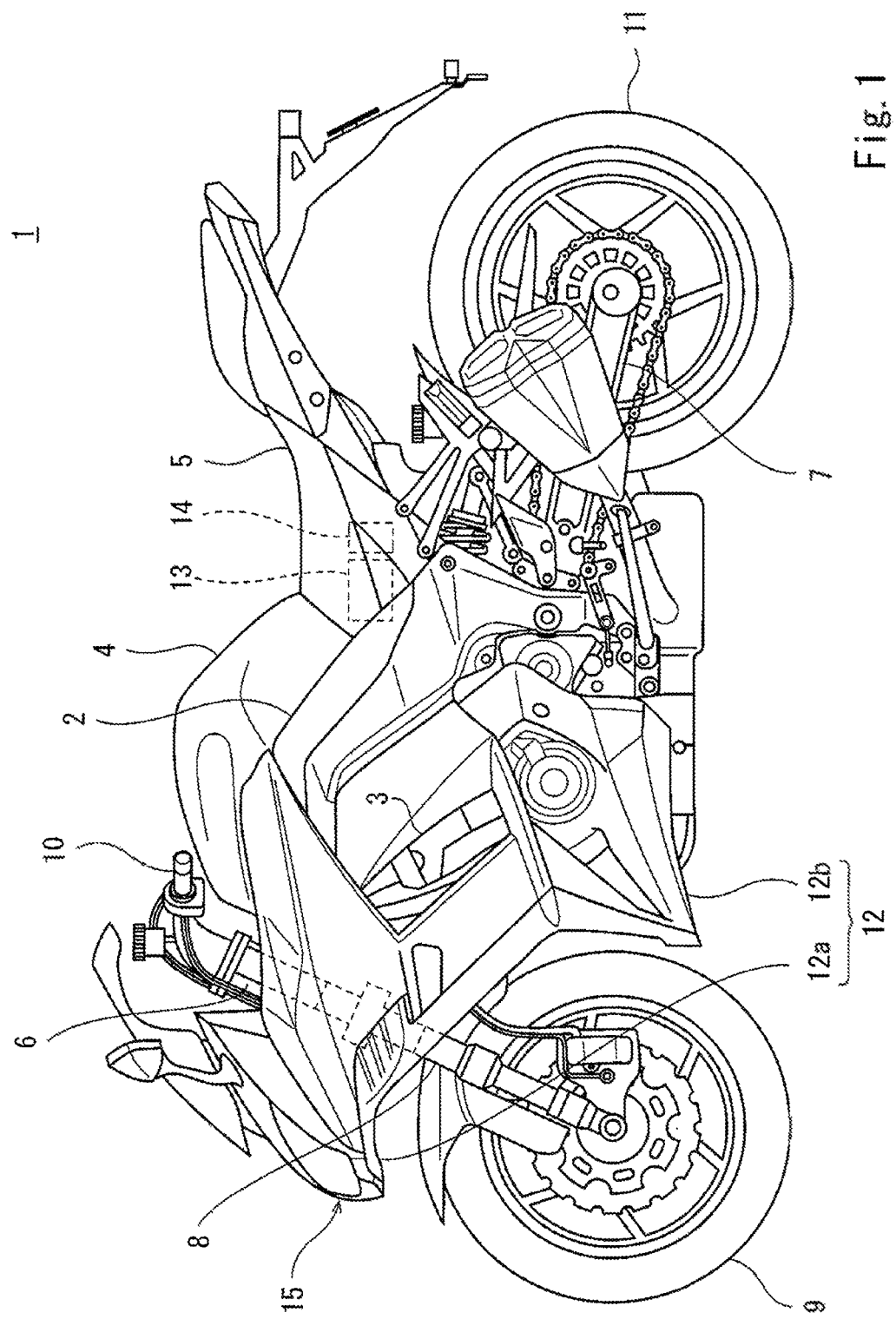
FIG. 1 is a left side view of a straddle-type vehicle according to an embodiment.

FIG. 1 is a left side view of the vehicle 1 according to an embodiment. Referring to FIG. 1, the straddle-type vehicle 1 is, for example, a motorcycle. The straddle-type vehicle 1 includes a vehicle body frame 2, a driving unit 3 which generates driving power for the straddle-type vehicle 1 to travel, a fuel tank 4, a seat 5, a steering shaft 6, a swing arm 7, a pair of front forks 8, a front wheel 9, a handle 10, a rear wheel 11, a cowling 12, a battery 13, an engine control unit (ECU) 14, and a headlamp device 15.

The vehicle body frame 2 extends in a forward and rearward direction. In the present embodiment, the driving unit 3 is an engine and is mounted on the vehicle body frame 2. The fuel tank 4 is disposed above the driving unit 3 and mounted on the vehicle body frame 2. The seat 5 is disposed behind the fuel tank 4 and mounted on the vehicle body frame 2. The steering shaft 6 extends vertically, and is mounted on the front portion of the vehicle body frame 2. The swing arm 7 extends rearward from a region that is in the vicinity of the center of the side surface of a vehicle body of the straddle-type vehicle 1. The front end portion of the swing arm 7 is mounted on the vehicle body frame 2 in such a manner that the swing arm 7 is vertically pivotable. The driving unit 3 may be an electric motor which generates driving power for allowing the straddle-type vehicle 1 to travel, or both of an engine and the electric motor.

The pair of front forks 8 are coupled to the steering shaft 6. The front wheel 9 is mounted on the lower end portions of the pair of front forks 8. The handle 10 is connected to the upper end portion of the steering shaft 6. The rear wheel 11 is mounted on the rear end portion of the swing arm 7. The cowling 12 is mounted on the vehicle body frame 2 to cover the front portion of the vehicle body. The cowling 12 includes a front cowling member 12a and a side cowling member 12b. The front cowling member 12a covers the upper end portions of the pair of front forks 8. The side cowling member 12b is disposed rearward of the front cowling member 12a and covers the front portion and right and left side portions of the driving unit 3. The battery 13 and the ECU 14 are mounted on the vehicle body frame 2 at locations below the seat 5. The headlamp device 15 is disposed at the front portion of the vehicle body, and is partially covered by the front cowling member 12a.

Figure 2:
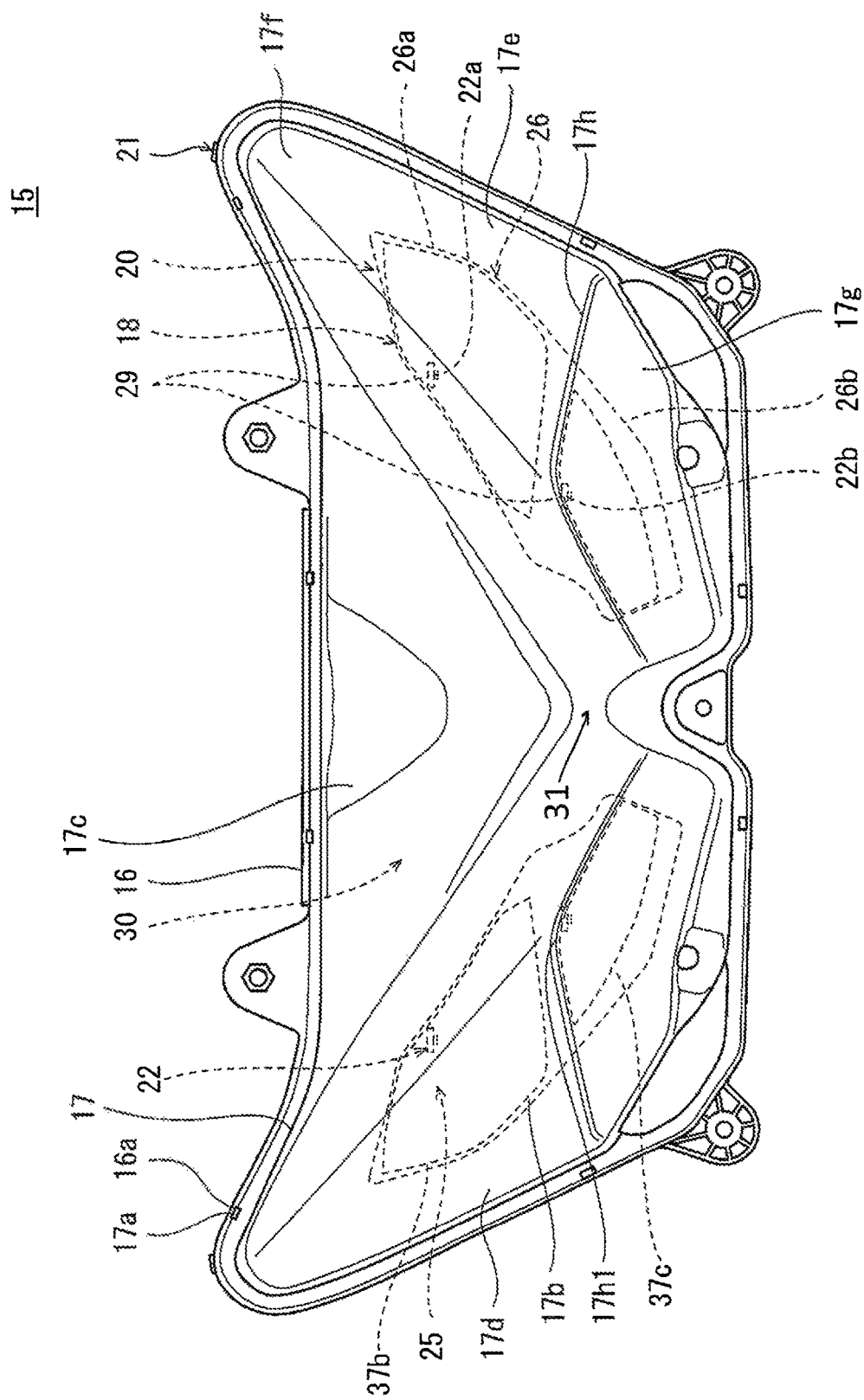
FIG. 2 is a front view of a headlamp device of the straddle-type of FIG. 1.
Figure 3:
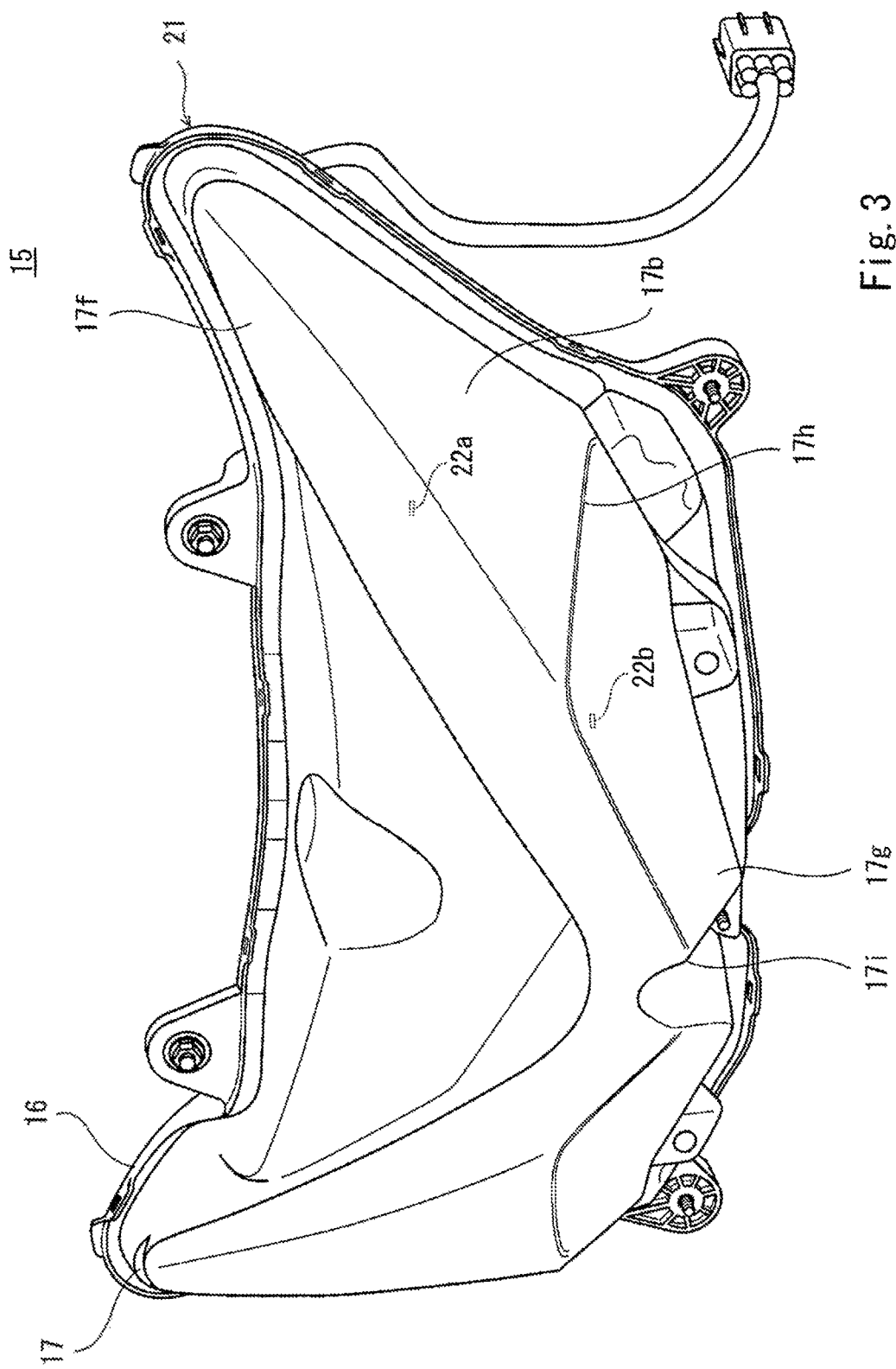
FIG. 3 is a perspective view of the headlamp device of FIG. 2.
Figure 4:
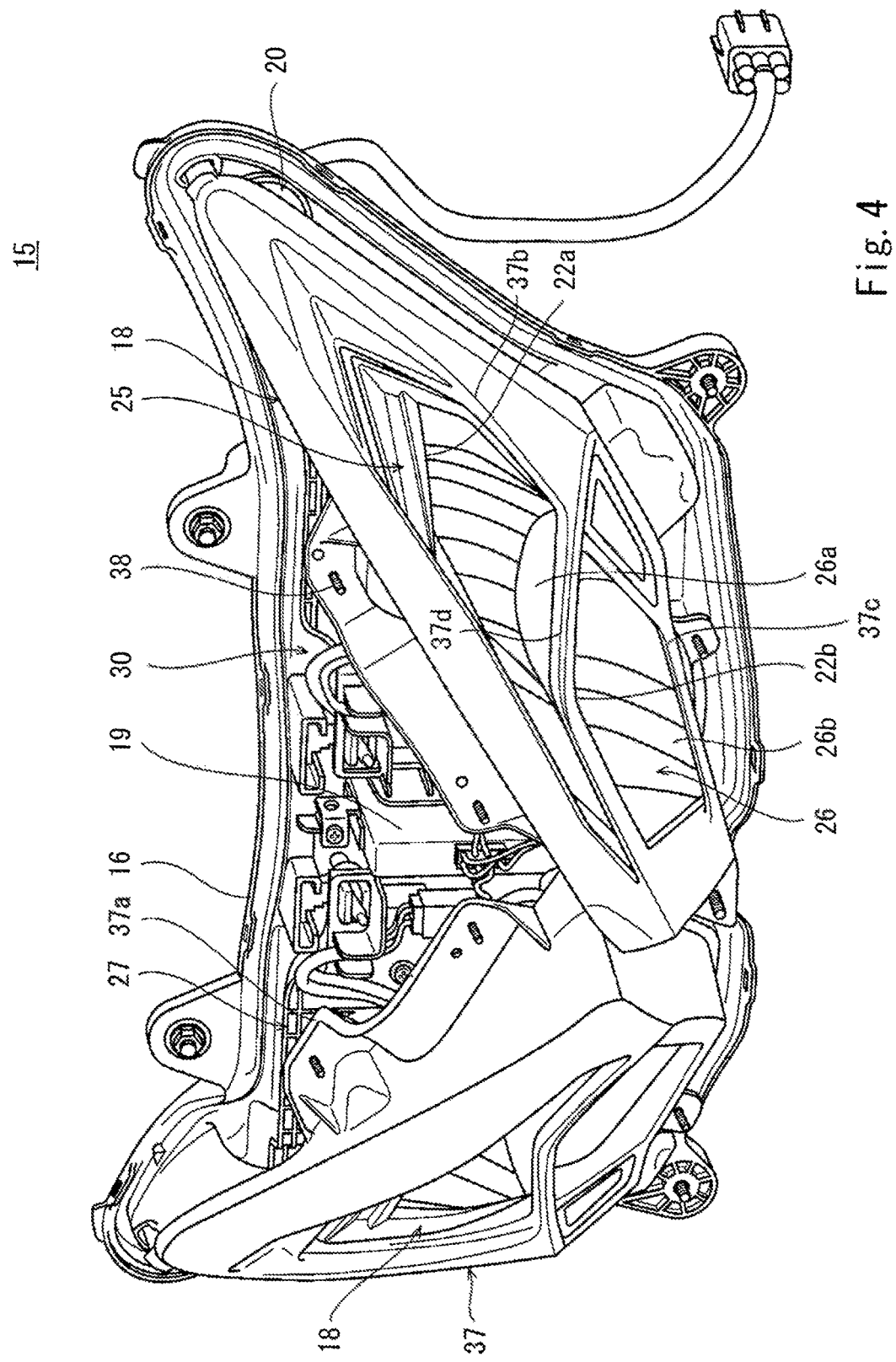
FIG. 4 is a perspective view of the headlamp device of FIG. 2, in which a cover member is not shown.

FIG. 2 is a front view of the headlamp device 15. FIG. 3 is a perspective view of the headlamp device 15 of FIG. 2. FIG. 4 is a perspective view of the headlamp device 15 of FIG. 2, in which a cover member 17 is not shown. As shown in FIGS. 2 to 4, the headlamp device 15 includes a pair of lamp units 18, a lighting circuit (power supply circuit) unit 19, optical axis adjustment units 20, and a lamp case 21.

For example, the pair of lamp units 18 are arranged with a gap 31 in the rightward and leftward direction (vehicle width direction). Each of the pair of lamp units 18 is a reflector-type headlamp unit including a light emitting section 25 and a reflector body 26. Each of the pair of lamp units 18 includes at least one light source. Specifically, each of the light emitting sections 25 includes two light emitting diode (LED) elements 22 (22a, 22b), as a plurality of light sources. The plurality of light sources function as forward lights which emit the light to the road surface.

In each of the lamp units 18, the LED elements 22 are apart from each other and emit the light in a forward direction. In the pair of light emitting sections 25, the pair of LED elements 22a are arranged as low beam light sources in the upper portions of the lamp units 18, while the pair of LED elements 22b are arranged as high beam light sources in the lower portions of the lamp units 18. When viewed from the front (in the front view), the LED element 22b is disposed at a location that is below the LED element 22a, and closer to a center in the rightward and leftward direction than the LED element 22a is. In this way, the two light sources 22 (the LED elements 22a, 22b) of each of the lamp units 18 are deviated from each other in directions perpendicular to the forward and rearward direction. More specifically, the LED elements 22a, 22b are deviated from each other in the rightward and leftward direction and in the vertical direction.

The LED elements 22a, 22b are mounted on a plurality of wiring substrates 29, respectively. The optical axis adjustment unit 20 adjusts the position of an optical axis of the low beam and the position of an optical axis of the high beam, by changing the position of the lamp unit 18 of the headlamp device 15. In this way, aiming of the lamp unit 18 is performed.

The headlamp device 15 is shifted between a low beam mode in which the LED element 22a is turned on (lighted) and a high beam mode in which the LED element 22b is turned on (lighted). For example, the shifting between the low beam mode and the high beam mode is performed by the rider's operation of a switch (not shown) attached on the handle 10. A light emission pattern of the high beam mode may be such that the low beam light source is turned off and the high beam light source is turned on, or both of the low beam light source and the high beam light source are turned on.

The reflector body 26 includes at least one reflector section. In the present embodiment, the reflector body 26 includes two reflector sections 26a, 26b which are apart from each other. The reflector section 26a reflects the light emitted from the LED element 22a, and the reflector section 26b reflects the light emitted from the LED element 22b. Inside the reflector body 26, the light emission surface of the LED element 22a is exposed to the reflector section 26a, and the light emission surface of the LED element 22b is exposed to the reflector section 26b. The light emission surface of the LED element 22a is exposed to emit the light in a downward direction to the reflector section 26a, and the light emission surface of the LED element 22b is exposed to emit the light in the downward direction to the reflector section 26b. For example, the reflector body 26 has a configuration in which the low beam reflector section 26a and the high beam reflector section 26b which are integrated with each other. However, this configuration is merely exemplary. The reflector body 26 may be constituted by two members which include the reflector section 26a and the reflector section 26b, respectively.

Each of the pair of lamp units 18 includes a plurality of emission ports to output the light emitted from the LED elements 22a, 22b. Specifically, each of the pair of lamp units 18 includes two adjacent emission ports 37b, 37c (described later) provided in the housing 37. Each of the pair of lamp units 18 emits the light emitted from the LED element 22a, through the emission port 37b, and emits the light emitted from the LED element 22b, through the emission port 37c. The emission ports 37b, 37c are apart from each other in the vertical direction. The reflector sections 26a, 26b are exposed through the emission ports 37b, 37c, respectively. The reflector section 26a causes the light emitted from the LED element 22a to be output through the emission port 37b. The reflector section 26b causes the light emitted from the LED element 22b to be output through the emission port 37c. In this way, the low beam light is output through the emission port 37b, and the high beam light is output through the emission port 37c. The lamp unit 18 may be a headlamp unit of a direct light emission type. In this case, the reflector body 26 may be omitted.

The lighting circuit unit 19 is supplied with the electric power from a power supply and turns on (lights) the LED elements 22a, 22b. The lamp case 21 includes a wall member 16 and a cover member 17 which are coupled to each other in the forward and rearward direction. The wall member 16 extends in the rightward and leftward direction and in the vertical direction, at a location that is rearward of the cover member 17. The wall member 16 is supported on the front portion of the vehicle body frame 2. At the peripheral edge of the wall member 16, a plurality of fitting portions 16a are provided apart from each other. At the peripheral edge of the cover member 17, a plurality of fitting portions 17a are provided apart from each other. Between the wall member 16 and the cover member 17, an inner space 30 is formed. The pair of lamp units 18 and the lighting circuit unit 19 are accommodated in the inner space 30 formed by fitting the fitting portions 16a of the wall member 16 to the fitting portions 17a of the cover member 17, respectively.

The cover member 17 is disposed in front of the wall member 16 and extends in the rightward and leftward direction and in the vertical direction. The cover member 17 has a streamline shape in which a dimension in the rightward and leftward direction and a dimension in the vertical direction are gradually increased, from a front end portion 17i toward the rear portion (hereinafter this shape will be simply referred to as the streamline shape). The cover member 17 includes the plurality of fitting portions 17a, at least one transmission section 17b (a pair of transmission sections 17b in the present embodiment), and a center portion 17c. The plurality of fitting portions 17a are disposed at the peripheral edge of the cover member 17 and apart from each other. The pair of transmission sections 17b are provided in the cover member 17 at locations which are in front of the pair of lamp units 18, and transmit therethrough in the forward direction the light having been emitted from the LED elements 22a, 22b and output through the plurality of emission ports 37b, 37c of the pair of lamp units 18. When viewed from the front, the transmission sections 17b extend to the right and the left, obliquely upward from the center of the cover member 17 in the rightward and leftward direction. The transmission sections 17b overlap with the reflector bodies 26 of the lamp units 18, respectively, in the forward and rearward direction. For example, of the pair of transmission sections 17b, a right transmission section 17d located at the right side of the center of the cover member 17 in the rightward and leftward direction and a left transmission section 17e located at the left side of the center of the cover member 17 have a symmetric shape in the rightward and leftward direction. The transmission sections 17b are bent in the vertical direction. Thus, the front surface of each of the pair of transmission sections 17b is formed with an upper surface (first surface) 17f and a lower surface (second surface) 17g.

The upper surface 17f is located in the upper portion of the transmission section 17b. The upper surface 17f extends obliquely upward from the center of the cover member 17 in the rightward and leftward direction to an outward region of the cover member 17 in the rightward and leftward direction. The lower surface 17g is located in the lower portion of the transmission section 17b and is bent with respect to the upper surface 17f. For example, the upper surface 17f and the lower surface 17g are adjacent to each other. The transmission section 17b has a ridge line formed by the upper surface 17f and the lower surface 17g. For example, this ridge line protrudes forward. This ridge line is provided with an edge 17h. In this configuration, the upper surface 17f and the lower surface 17g are adjacent to each other at the edge 17h as a boundary.

When viewed from the front, the edge 17h extends obliquely upward from the center of the cover member 17 in the rightward and leftward direction to an outward region of the cover member 17 in the rightward and leftward direction, and then obliquely downward to an outward region in the rightward and leftward direction, from an edge center portion 17h1 located above the LED element 22b. The edge 17h extends in the rightward and leftward direction through a gap formed between the two adjacent emission ports 37b, 37c. The edge 17h also extends in the rightward and leftward direction through a gap formed between the reflector sections 26a, 26b of the reflector body 26. The edge 17h overlaps with a frame section 37d (described later) of the housing 37 in the forward and rearward direction, and extends in the rightward and leftward direction. The edge 17h also extends in the rightward and leftward direction through a gap formed between a mounting location at which the LED element 22a is mounted on the wiring substrate 29 and a mounting location at which the LED element 22b is mounted on the wiring substrate 29.

The LED elements 22a, 22b emit the light, and then the reflector sections 26a, 26b reflect the light. Then, each of the pair of transmission sections 17b transmits therethrough the reflected light. More specifically, in each of the pair of transmission sections 17b, the upper surface 17f overlaps with the reflector section 26a in the forward and rearward direction, and the lower surface 17g overlaps with the reflector section 26b in the forward and rearward direction. In this configuration, in each of the pair of transmission sections 17b, the upper surface 17f transmits the light after the light has been emitted from the LED element 22a and reflected by the reflector section 26a, while the lower surface 17g transmits the light after the light has been emitted from the LED element 22b and reflected by the reflector section 26b.

The upper surface 17f protrudes gradually in the forward direction and is curved, in a direction perpendicular to the direction in which the upper surface 17f extends. In each of the pair of transmission sections 17b, the upper surface 17f and the lower surface 17g are closer to each other, from a rear portion toward a front portion. The edge 17h is provided on the ridge line formed by the front end edge of the upper surface 17f and the front end edge of the lower surface 17g. For example, the lower surface 17g is inclined in a downward direction from the front portion toward the rear portion. The lower surface 17g is formed as a curved surface which is recessed in a rearward direction, from the edge 17h toward the rear portion. Alternatively, for example, the lower surface 17g may be formed as a curved surface which swells in the forward direction, from the edge 17h toward the rear portion. The front surface of the center portion 17c of the cover member 17 is located rearward of the front surfaces of the pair of transmission sections 17b, between the pair of transmission sections 17b. The front surface of the center portion 17c is inclined in an upward direction, from the front portion toward the rear portion.

In the forward and rearward direction, a gap is formed between the reflector section 26a, 26b, and the transmission section 17b. With this gap, it becomes possible to secure light paths of the light emitted from the LED elements 22a, 22b and light paths of the light reflected by the reflector sections 26a, 26b, in the interior of the lamp case 21 of the headlamp device 15. Vertical spread of the light reflected by the reflector sections 26a, 26b is restricted by the peripheral edges of the emission ports 37b, 37c of the housing 37 which will be described later.

The pair of lamp units 18 further include a pair of housings 37 disposed in front of the wall member 16. Each of the housings 37 is disposed between the cover member 17, and the LED elements 22a, 22b in the forward and rearward direction, and is made of a material which is not light-transmissive. Inside the housing 37, the light emitting section 25 and the reflector body 26 are accommodated. The housing 37 includes the mounting section 37a, the emission ports 37b, 37c, and the frame section 37d. The mounting section 37a has a plate shape, and protrudes upward from the upper portion of the housing 37. The mounting section 37a is fastened to the cover member 17 by use of fastener members 38. The emission ports 37b, 37c are provided in the front portion of the housing 37. For example, the emission ports 37b, 37c are apart from each other in the vertical direction. The emission port 37b is provided in the upper portion of the housing 37. The reflector section 26a is exposed through the emission port 37b. The emission port 37c is provided in the lower portion of the housing 37. The reflector section 26b is exposed through the emission port 37c. In the housing 37, the emission port 37c is disposed at a location that is below the emission port 37b and closer to the center in the rightward and leftward direction. The emission port 37b is disposed above the emission port 37c, and extends outward from the center in the rightward and leftward direction.

The frame section 37d extends in the rightward and leftward direction, and overlaps with a gap formed between the emission ports 37b, 37c, in the forward and rearward direction. Since the housing 37 includes the frame section 37d, the housing 37 is configured as a frame member which is disposed between the cover member 17 and the LED elements 22a, 22b, in the forward and rearward direction, and overlaps with the gap formed between the two adjacent emission ports 37b, 37c, in the forward and rearward direction. The housing 37 is supported on the optical axis adjustment unit 20.

Figure 5:
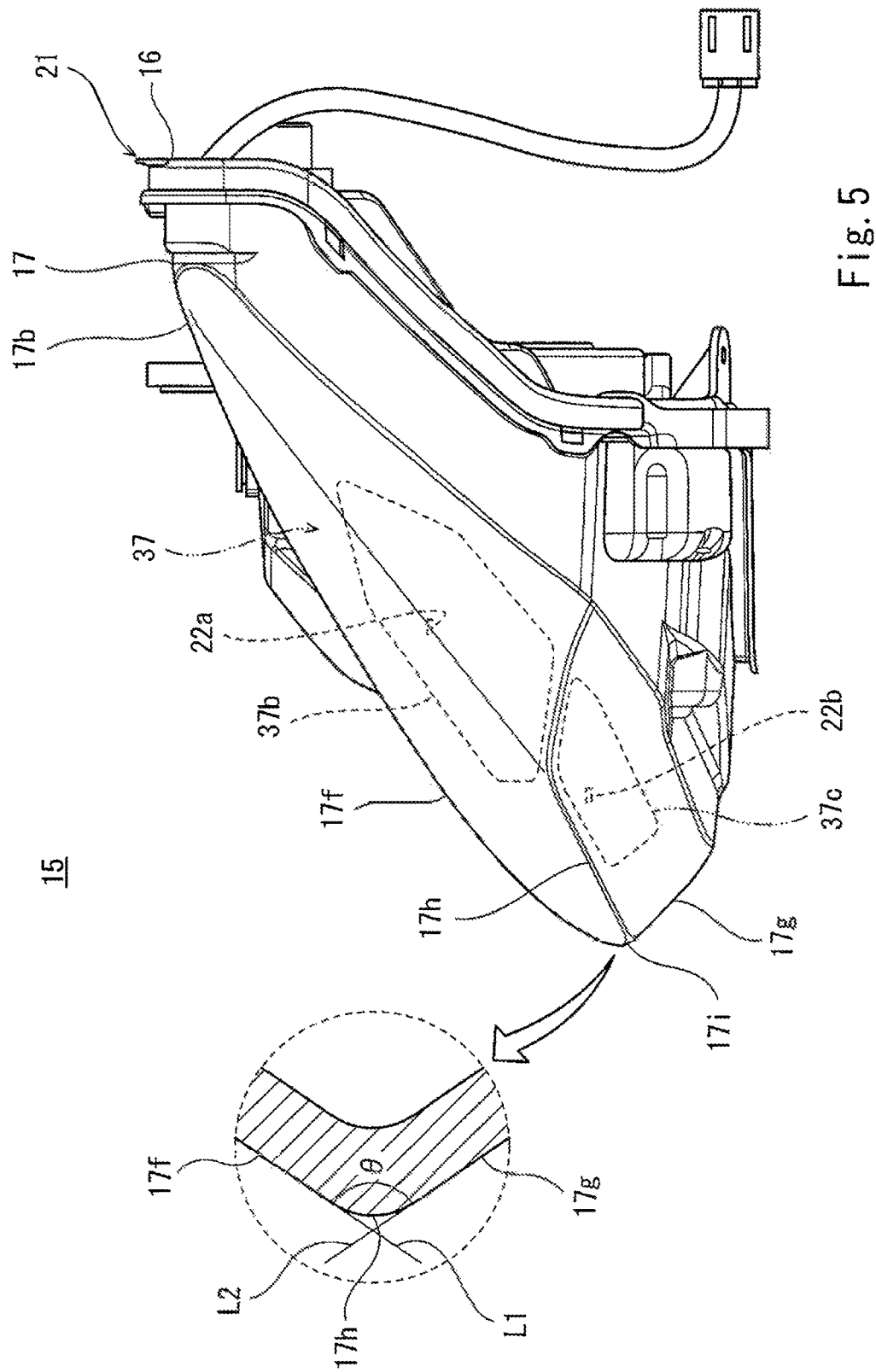
FIG. 5 is a left side view of the headlamp device of FIG. 2, and an enlarged cross-sectional view of an edge of the cover member.

FIG. 5 is a left side view of the headlamp device 15 of FIG. 2, and an enlarged cross-sectional view of the edge 17h of the cover member 17. The enlarged cross-sectional view of FIG. 5 shows a cross-section of the transmission section 17b which is perpendicular to the direction in which the edge 17h extends. When viewed from the side (in the side view), in each of the pair of transmission sections 17b of the cover member 17, the upper surface 17f is inclined in the upward direction, from the front end portion 17i of the cover member 17 toward the rear portion, and the lower surface 17g is inclined in the downward direction from the front end portion 17i of the cover member 17 toward the rear portion. The upper surface 17f and the lower surface 17g are bent with respect to each other, and are gradually curved in the rearward direction. Of the emission ports 37b, 37c of the housing 37, the upper emission port 37b is located outward in the rightward and leftward direction relative to the lower emission port 37c, and at least a portion of the upper emission port 37b is located rearward of the lower emission port 37c.

The edge 17h protrudes forward father than the upper surface 17f and the lower surface 17g of the transmission section 17b which are located at both sides in the direction perpendicular to the direction in which the edge 17h extends. As shown in the enlarged cross-sectional view of FIG. 5, the edge 17h has a band shape with a predetermined width. The contour of the front surface of the edge 17h extends in the vertical direction, and protrudes forward father than the upper surface 17f and the lower surface 17g. For example, the contour of the edge 17h has a substantially circular-arc shape.

A value of an angle θ formed between a tangential line L1 of the contour of the upper surface 17f and a tangential line L2 of the contour of the lower surface 17g, in the enlarged cross-sectional view of FIG. 5, can be suitably set. In the present embodiment, the value of the angle θ is desirably set to a value which is equal to or larger than 80 degrees and less than 160 degrees. More specifically, the value of the angle θ is more desirably set to a value which is equal to or larger than 80 degrees and less than 150 degrees, more desirably set to a value which is equal to or larger than 80 degrees and less than 140 degrees, and more desirably set to a value which is equal to or larger than 80 degrees and less than 130 degrees. In the present embodiment, the value of the angle θ is set to a value which is equal to or larger than 80 degrees and less than 120 degrees.

In a case where the front surface of the headlamp device which emits the light from the light source is provided with the edge, it is difficult to reduce the angle θ of the edge, because of a need to prevent scattering of the light. In view of this, in the present embodiment, since the edge 17h is disposed between the two light sources 22 (the LED elements 22a, 22b), the light emitted to the edge 17h can be reduced. Therefore, it becomes possible to suppress the effects of the edge 17h on the light emission characteristics of the light emission to the road surface or the like. In this way, in the present embodiment, a limitation of the angle θ of the edge 17h can be reduced, the external appearance of the cover member 17 can be designed more flexibly, and the effects (e.g., a streak of light) of the edge 17h on an irradiation region of the road surface which is irradiated with the light emitted from the headlamp device 15 can be suppressed.

More specifically, in the headlamp device 15, even in a case where the external appearance of the cover member 17 of the headlamp device 15 is designed so that the edge 17h is provided on the ridge line formed by the upper surface 17f and the lower surface 17g of the transmission section 17b, the light emitted from the LED elements 22a, 22b and output through the emission ports 37b, 37c is less likely to contact the edge 17h, because the edge 17h extends through the gap formed between the two adjacent emission ports 37b, 37c of the housing 37. Thus, the light emission characteristics of the headlamp device 15 are not affected by the edge 17h, and good light emission characteristics of the light emission from the headlamp device 15 to the road surface or the like can be kept. As a result, it becomes possible to design the external appearance of the cover member 17 more flexibly while keeping required light emission characteristics of the headlamp device 15 of the straddle-type vehicle 1.

When viewed from the front, the edge 17h of the transmission section 17b extends through the gap formed between the two reflector sections 26a, 26b of the reflector body 26, the light paths of the light reflected by the two reflector sections 26a, 26b are less likely to contact the edge 17h. Therefore, the light paths of the light reflected by the two reflector sections 26a, 26b are not affected by the edge 17h.

In the headlamp device 15, since the two light sources (the LED elements 22a, 22b) are deviated from each other in the direction perpendicular to the forward and rearward direction, the edge 17h can be easily formed in the cover member 17. More specifically, the two light sources 22 (the LED elements 22a, 22b) are deviated from each other in the rightward and leftward direction and in the vertical direction. This makes it possible to increase a spacing formed between the two light sources 22 (the LED elements 22a, 22b), and increase the region of the edge 17h in the cover member 17 while suppressing the effects on the light emission characteristics.

Between the cover member 17 and the LED elements 22a, 22b in the forward and rearward direction, the frame section 37d overlaps with the gap formed between the two adjacent emission ports 37b, 37c, in the forward and rearward direction, and the edge 17h overlaps with the frame section 37d in the forward and rearward direction. The frame section 37d serves to more effectively prevent the light emitted from the LED elements 22a, 22b and output through the two emission ports 37b, 37c from contacting the edge 17h. This makes it possible to prevent the light emitted from the LED elements 22a, 22b from being scattered by the edge 17h.

The frame section 37d and the edge 17h are disposed to overlap with each other, in the forward and rearward direction. Therefore, by the frame section 37d, the external appearance of the cover member 17 can be designed to make the edge 17h noticeable. In addition, by the frame section 37d, the light paths of the light emitted from the LED elements 22a, 22b can be well defined.

The upper surface 17f and the lower surface 17g of the transmission section 17b are closer to each other, from the rear portion toward the front portion. The edge 17h is provided on the ridge line formed by the front end edge of the upper surface 17f and the front end edge of the lower surface 17g. The edge 17h provided in the transmission section 17b protrudes forward farther than the upper surface 17f and the lower surface 17g do. In this configuration, long light paths of the light emitted from the LED elements 22a, 22b, from the LED elements 22a, 22b to the transmission section 17b, can be easily secured, compared to a case where the edge provided in the transmission section 17b protrudes rearward father than the first surface and the second surface do. For this reason, between the LED elements 22a, 22b, and the transmission section 17b, the positions of the light paths of the light emitted from the LED elements 22a, 22b can be easily adjusted, and it becomes possible to prevent the light emitted from the two LED elements 22a, 22b from contacting the edge 17h.

The two adjacent emission ports 37b, 37c are apart from each other in the vertical direction. The upper surface 17f and the lower surface 17g of the transmission section 17b are adjacent to each other at the edge 17h as a boundary. The lower surface 17g is inclined in the downward direction from the front portion toward the rear portion. In this configuration, a projection area of the headlamp device 15 in the front view can be reduced. Thus, the external appearance of the cover member 17 can be easily designed to have, for example, the streamline shape. Further, a traveling resistance received from the air flowing from the front can be reduced, during traveling of the straddle-type vehicle 1.

Since the lower surface 17g of the transmission section 17b is formed as the curved surface which is recessed in a rearward direction, from the edge 17h toward the rear portion, the lower surface 17g is less noticeable. Therefore, the external appearance of the headlamp device 15 can be made compact, and the lower surface 17g does not reflect external light toward, for example, a person riding in another vehicle coming from an opposite direction.

Of the two adjacent emission ports 37b, 37c, the upper emission port 37b is located outward in the rightward and leftward direction relative to the lower emission port 37c, at least a portion of the upper emission port 37b is located rearward of the lower emission port 37c, and the edge 17h extends in the rightward and leftward direction. In this configuration, the external appearance of the cover member 17 can be designed so that the edge 17h extends in the rightward and leftward direction, and the size of the lower surface 17g of the transmission section 17b which is seen in a plan (top) view can be reduced. In this way, the external appearance of the headlamp device 15 can be made compact.

Of the two adjacent emission ports 37b, 37c, the low beam is output through the emission port 37b, and the high beam is output through the emission port 37c. Therefore, in the headlamp device 15 in which the emission port 37b through which the low beam is output and the emission port 37c through which the high beam is output are arranged in the vertical direction, the external appearance of the cover member 17 can be designed more flexibly while keeping required light emission characteristics of the headlamp device 15.

Each of the pair of lamp units 18 disposed at the right and left sides includes the edge 17h. For example, compared to a case where an edge extending in the rightward and leftward direction is provided in a single lamp unit of a straddle-type vehicle including the single lamp unit, the external appearance of the cover member 17 can be designed so that the total length of the edges 17h provided in the transmission sections 17b of the pair of lamp units 18 can be increased while reducing the bores of the emission ports 37b, 37c of each of the lamp units 18.

The two LED elements 22a, 22b are apart from each other in the vertical direction. When viewed from the front, the lower LED element 22b is disposed to be closer to the center in the rightward and leftward direction than the upper LED element 22a is. Therefore, it becomes possible to design the headlamp device 15 so that the two LED elements 22a, 22b are arranged in the vertical direction and deviated from each other in the rightward and leftward direction, when viewed from the front. In addition, it becomes possible to design the external appearance of the cover member 17 more flexibly while keeping required light emission characteristics of the headlamp device 15.

Since the LED elements 22 are used as the light sources, the angle of the light emission of the light source is smaller and spread of the emitted light is suppressed, compared to other kinds of light sources. Therefore, it becomes possible to more effectively prevent the light emitted from the LED elements 22a, 22b from contacting the edge 17h. Even in a case where the LED element 22 is used as a light source with a brightness (luminance) higher than that of, for example, a light source including a filament, the edge 17h can be suitably provided in the transmission section 17b. In addition, the two adjacent emission ports 37b, 37c can be made closer to each other while keeping required light emission characteristics of the headlamp device 15. Further, the external appearance of the cover member 17 can be designed so that the edge 17h of the transmission section 17b protrudes forward farther than the upper surface 17f and the lower surface 17g do, and an angle formed between the upper surface 17f and the lower surface 17g, at a side which is opposite to the side where the edge 17h protrudes, in the cross-section of the cover member 17 perpendicular to the direction in which the edge 17h extends is reduced. Thus, the external appearance of the cover member 17 can be designed more flexibly.

The edge 17h extends in the rightward and leftward direction through the gap formed between the mounting location at which the LED element 22a is mounted on the wiring substrate 29 and the mounting location at which the LED element 22b is mounted on the wiring substrate 29. This makes it possible to prevent the light emitted from the two LED elements 22a, 22b from contacting the edge 17h. The edge 17h can be suitably provided in the transmission section 17b.

In the cross-section of the transmission section 17b perpendicular to the direction in which the edge 17h extends, the edge 17h protrudes forward farther than the upper surface 17f and the lower surface 17g located at the both sides of the edge 17h do. In this configuration, the edge 17h can be provided while preventing the light emitted from the two LED elements 22a, 22b from being scattered by the edge 17h. Hereinafter, regarding Modified Examples of the present embodiment, differences from the present embodiment will be mainly described.

Modified Example 1

Figure 6:
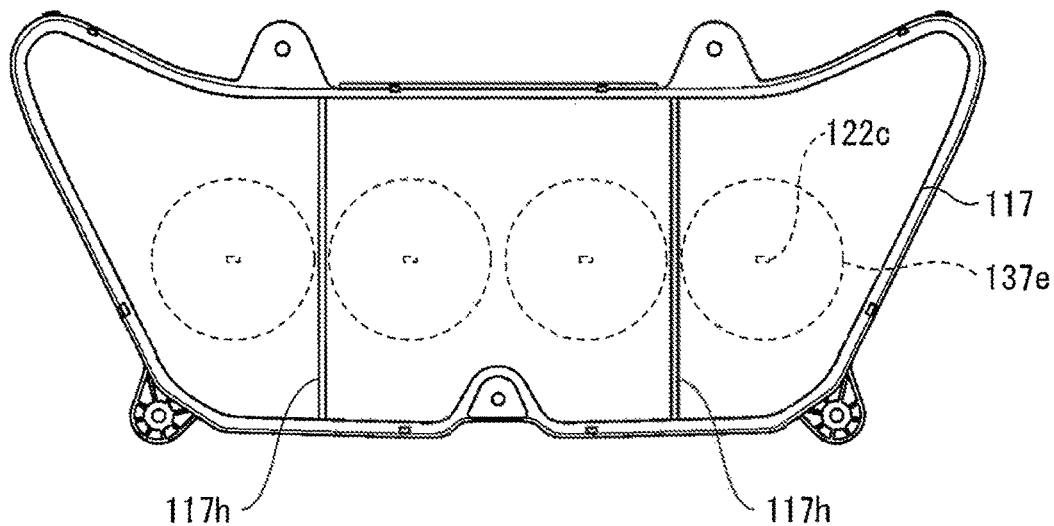
FIG. 6 is a front view of a headlamp device according to Modified Example 1.

FIG. 6 is a front view of a headlamp device 115 according to Modified Example 1.

The headlamp device 115 is provided with a plurality of (four in the present embodiment) emission ports 137e arranged in the rightward and leftward direction. When viewed from the front, LED elements 122c are disposed inside the emission ports 137e, respectively. Edges 117h of a cover member 117 are disposed outward in the rightward and leftward direction relative to a center of the cover member 117 in the rightward and leftward direction (in the vehicle width direction). Each of the edges 117h of the cover member 117 extends in the vertical direction through a gap formed between the two adjacent emission ports 137e.

In the headlamp device 115 having the above-described configuration, the effects of the edge 117h on the irradiation region of the road surface which is irradiated with the light emitted from the headlamp device 115 can be suppressed, and the external appearance of the cover member 117 can be designed more flexibly.

Modified Example 2

Figure 7:
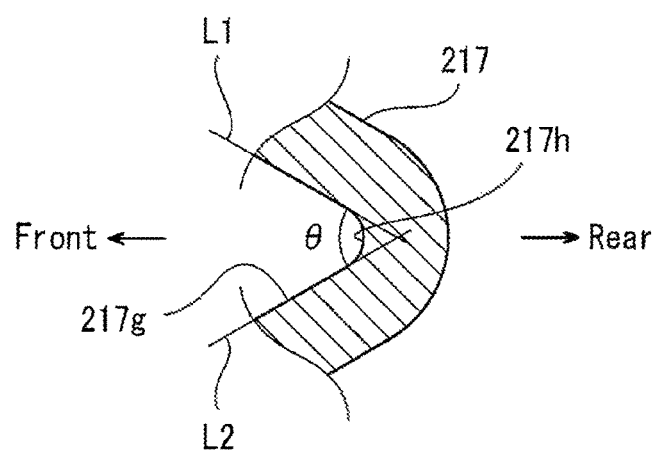
FIG. 7 is an enlarged cross-sectional view of an edge of a cover member according to Modified Example 2.

FIG. 7 is an enlarged cross-sectional view of an edge 217h of a cover member 217 according to Modified Example 2. The contour of the front surface of the edge 217h extends in the vertical direction, and protrudes rearward farther than an upper surface 217f and a lower surface 217g do. A value of an angle θ formed between a tangential line L1 of the upper surface 217f and a tangential line L2 of the lower surface 217g, in this enlarged cross-section, is set to a value smaller than 80 degrees.

In Modified Example 2, the value of the angle θ is desirably set to a value which is equal to or larger than 40 degrees and less than 80 degrees. Specifically, the value of the angle θ is more desirably set to a value which is equal to or larger than 40 degrees and less than 75 degrees, more desirably set to a value which is equal to or larger than 40 degrees and less than 70 degrees, and more desirably set to a value which is equal to or larger than 40 degrees and less than 65 degrees. In Modified Example 2, the value of the angle θ is desirably set to a value which is equal to or larger than 40 degrees and less than 60 degrees.

In the cover member 217 having the above-described configuration, the external appearance of the cover member 217 can be designed more flexibly, while preventing the light emitted from the light source from contacting the edge 217h.

The present invention is not limited to the above-described embodiment. The above-described configurations may be changed, added to or deleted from, within a scope of the spirit of the preset invention. The vehicle is not limited to the motorcycle and may be other vehicles such as a three-wheeled vehicle, personal watercraft (PWC), a snow mobile, and an all terrain vehicle (ATV).

The frame member included in the headlamp device 15 of the present embodiment is not limited to the housing 37. For example, the frame member may be constituted by a member such as a decorative sheet or a sheet member disposed between the cover member 17 and the lamp unit 18, in the forward and rearward direction. The frame member may include the member such as the decorative sheet or the sheet member, and the housing 37. This member and the housing 37 may overlap with each other in the forward and rearward direction.

In the headlamp device 15, of the emission ports 37b, 37c, the whole of the upper emission port 37b is located rearward of the lower emission port 37c.

The lamp unit 18 may include at least one light source. In a case where the lamp unit 18 includes a plurality of light sources, the edge 17h need not extend through a gap formed between the two adjacent light sources.

For example, when viewed from the front, at least one light source may be disposed at a location on one side of the lamp unit 18 in the direction perpendicular to the direction in which the edge 17h extends, the lamp unit 18 may be provided with the two adjacent emission ports 37b, 37c through which the light emitted from the light sources is output, and the edge 17h may extend through a gap formed between the two adjacent emission ports 37b, 37c.

The light source may be, for example, an organic electroluminescent device (OELD) instead of the LED element. Further, the pair of lamp units 18 may include a plurality of light emitting elements of different kinds. The pair of lamp units 18 may be arranged, for example, in the vertical direction, instead of the rightward and leftward direction. The edge of the cover member may extend in directions other than the rightward and leftward direction and the vertical direction.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

The invention claimed is:

1. A headlamp device of a straddle-type vehicle, the head lamp device comprising:
    at least one lamp unit including at least one light source which includes a light emitting diode configured as a forward light, and a plurality of emission ports through which light emitted from the lamp unit is output to a road surface forward of the vehicle; and
    a cover member including a transmission section which transmits in a forward direction of a vehicle body, the light output through the plurality of emission ports, and covering a front portion of the lamp unit,
    wherein the transmission section includes a first surface, and a second surface bent with respect to the first surface, and an edge is provided on a ridge line formed by the first surface and the second surface, and
    wherein the edge extends through a gap formed between two adjacent emission ports of the plurality of emission ports.

2. The headlamp device according to claim 1,
    wherein the lamp unit further includes two reflector sections which are provided to correspond to the two adjacent emission ports, respectively, reflect the light emitted from the lamp unit, and cause the light to be output through the two adjacent emission ports, and
    wherein when viewed from a front, the edge extends through a gap formed between the two reflector sections, and
    wherein the two reflector sections reflect the light emitted from the light source while preventing reflected light from contacting the edge.

3. The headlamp device according to claim 1, further comprising:
a frame member disposed between the cover member and the light source in a forward and rearward direction of the vehicle body,
wherein the frame member overlaps with the gap formed between the two adjacent emission ports, in the forward and rearward direction, and
wherein the edge overlaps with the frame member in the forward and rearward direction.

4. The headlamp device according to claim 1,
wherein the first surface and the second surface of the transmission section are closer to each other in a vertical direction, from a rear portion toward a front portion, and
wherein the ridge line is formed by a front end edge of the first surface and a front end edge of the second surface, and the edge is provided on the ridge line.

5. The headlamp device according to claim 1,
wherein the two adjacent emission ports are apart from each other in a vertical direction,
wherein the transmission section includes an upper surface and a lower surface which are adjacent to each other at the edge as a boundary, and
wherein the lower surface is inclined in a downward direction, from a front portion toward a rear portion.

6. The headlamp device according to claim 5,
wherein the lower surface is a curved surface which is recessed in a rearward direction, from the edge toward a rear portion.

7. The headlamp device according to claim 5,
wherein an upper emission port of the two adjacent emission ports is located outward in a rightward and leftward direction of the vehicle body relative to a lower emission port of the two adjacent emission ports, and at least a portion of the upper emission port is located rearward of the lower emission port, and
wherein the edge extends in the rightward and leftward direction.

8. The headlamp device according to claim 1,
wherein a low beam is output through a first emission port of the two adjacent emission ports, and a high beam is output through a second emission port of the two adjacent emission ports.

9. The headlamp device according to claim 1,
wherein the at least one lamp unit is a part of a pair of lamp units disposed at right and left sides, respectively, in a rightward and leftward direction of the vehicle body, and
wherein the edge is provided in each of the pair of lamp units.

10. The headlamp device according to claim 1,
wherein the at least one light source is a part of two light sources of the lamp unit disposed apart from each other in a vertical direction, and
wherein when viewed from a front, a lower light source of the two light sources is disposed closer to a center of the vehicle body in a rightward and leftward direction of the vehicle body than an upper light source of the two light sources.

11. The headlamp device according to claim 2, further comprising a reflector body including the two reflector sections which are integrated with each other.

12. The headlamp device according to claim 5, wherein in a cross-section of the transmission section which is perpendicular to an extension direction of the edge, an angle formed between a tangential line of a contour of the upper surface and a tangential line of a contour of the lower surface is set to a value which is equal to or larger than 80 degrees and less than 160 degrees.

13. The headlamp device according to claim 12, wherein the edge is disposed between two light sources.

14. The headlamp device according to claim 1,
wherein the two adjacent emission ports are apart from each other in a vertical direction,
wherein the transmission section includes an upper surface and a lower surface which are adjacent to each other at the edge as a boundary, and a contour of a front surface of the edge extends in the vertical direction, and protrudes rearward farther than the upper surface and the lower surface, and
wherein in a cross-section of the transmission section which is perpendicular to an extension direction of the edge, an angle formed between a tangential line of a contour of the upper surface and a tangential line of a contour of the lower surface is set to a value which is less than 80 degrees.

15. The headlamp device according to claim 14, wherein the edge is disposed between two light sources.

16. The headlamp device according to claim 1, wherein two light sources are deviated from each other in a rightward and leftward direction and in a vertical direction.

17. The headlamp device according to claim 16,
wherein the two adjacent emission ports are located apart from each other in a vertical direction,
wherein of the two adjacent emission ports, an upper emission port is located outward in the rightward and leftward direction relative to a lower emission port in a state in which at least a portion of the upper emission port is located rearward of the lower emission port, and the edge extends in the rightward and leftward direction.

18. A headlamp device of a straddle-type vehicle, the headlamp device comprising:
at least one lamp unit including at least one light source, and a plurality of emission ports through which light emitted from the lamp unit is output; and
a cover member including a transmission section which transmits in a forward direction of a vehicle body, the light output through the plurality of emission ports, and covering a front portion of the lamp unit,
wherein on each of right and left sides, the transmission section includes:
a first surface;
a second surface bent with respect to the first surface; and
an edge provided on a ridge line formed by the first surface and the second surface, and
wherein each of the edges provided on the right and left sides, respectively, extends through a gap formed between two adjacent emission ports of the plurality of emission ports.

* * * * *